W. V. TURNER.
EMERGENCY VALVE DEVICE.
APPLICATION FILED SEPT. 25, 1913.
1,099,905.
Patented June 9, 1914.
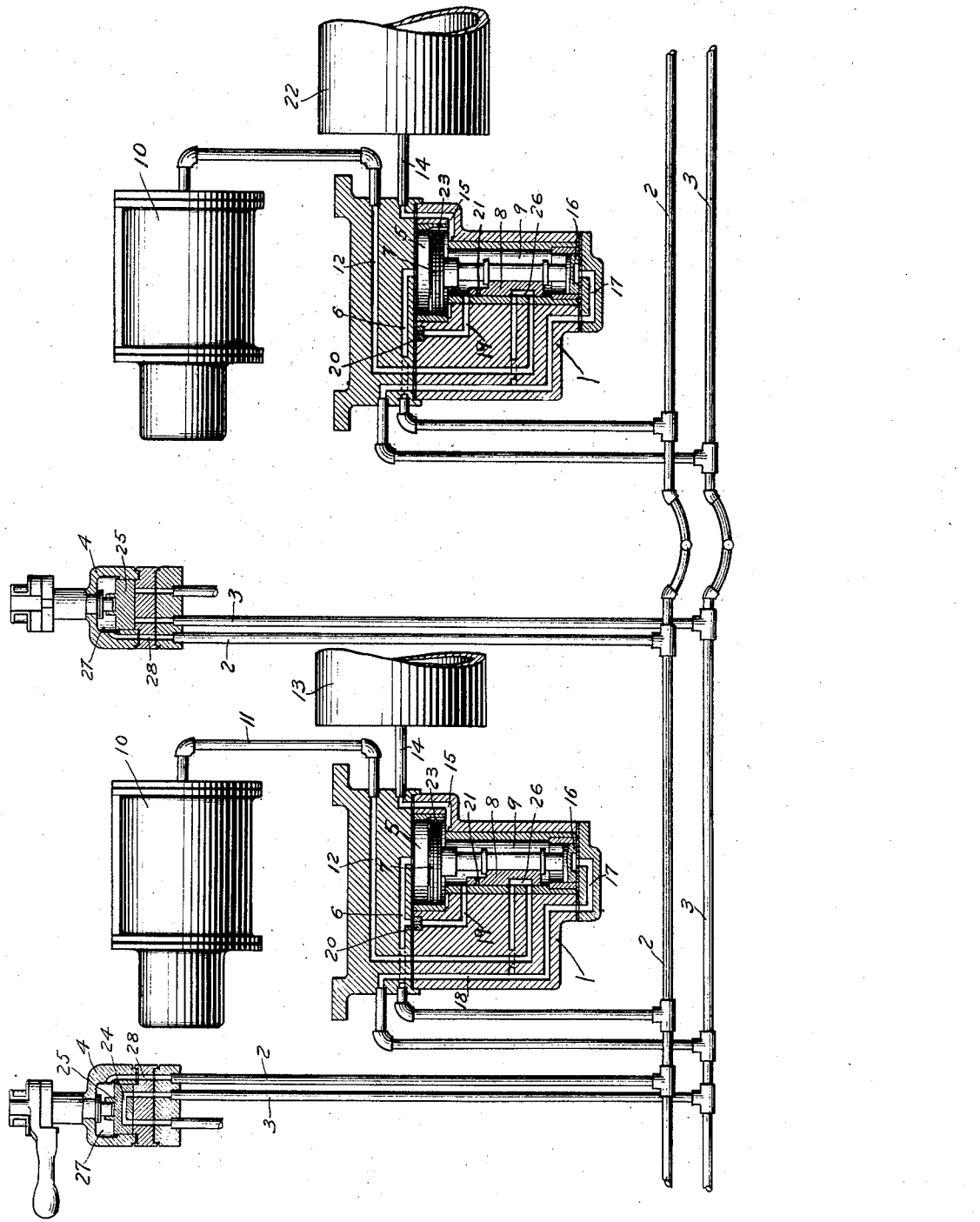
WITNESSES
INVENTOR
Walter V. Turner
by Wm. N. Cady
Atty.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

EMERGENCY-VALVE DEVICE.

1,099,905.            Specification of Letters Patent.            Patented June 9, 1914.

Application filed September 25, 1913. Serial No. 791,744.

*To all whom it may concern:*

Be it known that I, WALTER V. TURNER, a citizen of the United States, residing at Edgewood, in the county of Allegheny and State of Pennsylvania, have invented new and useful Improvements in Emergency-Valve Devices, of which the following is a specification.

The invention relates to fluid pressure brakes, and more particularly to a combined straight air and automatic emergency brake equipment.

An equipment of the above character is more particularly adapted for use in electric traction service on motor cars operated singly or with one or more trailer cars similarly equipped.

In order to simplify and reduce the weight of the brake apparatus as much as possible, it has heretofore been proposed to employ a so-called two pipe system, in which the only pipes to the brake valve are the automatic brake pipe and the straight air pipe, the brake pipe being charged from the main reservoir through the emergency valve device and serving as the supply pipe to the brake valve for straight air applications of the brakes.

With a brake equipment of the above character, in order to release the brakes after an emergency application, it has been proposed to provide a restricted equalizing port through the piston of the emergency valve device, so that upon closing the emergency vent from the brake pipe, fluid at main reservoir pressure on one side of the emergency piston could equalize into the brake pipe and thereby permit the emergency valve device to return to normal release position. On trailer cars, however, where there is no main reservoir and the supply reservoir must be charged from the brake pipe, a port through the emergency piston would permit the exhaust of fluid from the supply reservoir and the brake cylinder to the atmosphere upon an emergency application of the brakes.

The principal object of my present invention is to provide an improved brake apparatus of the combined straight air and automatic emergency type in which the above mentioned difficulty is obviated.

In the accompanying drawing, the single figure illustrates diagrammatically, car air brake equipments applied to a motor car and trailer, with my improvement embodied therein.

As shown in the drawing, the brake apparatus on the motor car may comprise an emergency valve device 1 connected to the automatic brake pipe 2 and the straight air pipe 3, said pipes being connected to brake valves 4 located at opposite ends of the car. In the emergency valve device 1 is a piston chamber 5 connected by passage 6 to the brake pipe 2 and containing the emergency piston 7. An emergency slide valve 8 is contained in valve chamber 9 and is adapted to be operated by piston 7. Brake cylinder 10 is connected to pipe 11 and passage 12 leading to the seat of slide valve 8 and the main reservoir 13, which may be charged in the usual way from a motor driven compressor, is connected to valve chamber 9 through pipe 14 and passage 15.

While various other types of emergency valve devices may be employed in connection with my improvement, the one illustrated in the drawing is shown as provided with a fluid operated piston head 16, subject on one side to the fluid pressure in valve chamber 9 and having the opposite side open to a passage 17 leading to straight air passage 18.

A passage 19, leading to the seat of slide valve 8, communicates with the brake pipe passage 6 and preferably contains a choke plug 20, having a restricted port for limiting the rate of flow from the valve chamber 9 and the main reservoir to the brake pipe.

In normal release position, the passage 19 is fully open to the valve chamber 9, but in emergency position of the slide valve 8, a restricted port 21 registers with said passage, so as to limit the rate of flow through said passage.

On the trailer car, the same emergency valve is employed except that the passage 19 is blanked, so that fluid under pressure cannot flow from the valve chamber 9 to the brake pipe. Instead of the main reservoir the trailer car has an auxiliary reservoir 22 connected to the supply pipe 14.

In operation, fluid under pressure from the main reservoir on the motor car flows through pipe 14 and passage 15 to valve chamber 9 and thence through passage 19 and feed groove 23 to the brake pipe 2, charging the same to the normal pressure carried in the system. With one of the brake valves 4 in release position, the straight air pipe 3 is connected to the atmosphere through cavity 24 in the rotary valve 25 of the brake valve, so that the outer face of piston head 16 is subject to atmospheric pressure. The differential of pressures thus provided on the emergency valve device insures the movement of same to release position, in which cavity 26 in the slide valve 8 connects brake cylinder passage 12 with straight air pipe 18. The brake cylinder 10 is thus open to the atmosphere. On the trailer car, fluid supplied to the brake pipe on the motor car flows through feed groove 23 to valve chamber 9 and the auxiliary reservoir 22 is thereby charged to the normal pressure carried. A straight air application of the brakes may be made by turning the brake valve handle to straight air application position, in which the straight air pipe 3 is connected to the rotary valve chamber 27 by a port through the rotary valve 25. As the rotary valve chamber 27 is connected to the brake pipe 2 by passage 28, it will be seen that fluid is supplied to the straight air pipe from the brake pipe, which in turn is supplied with fluid from the main reservoir by flow through the passage 19 and choke plug 20. Fluid supplied to the straight air pipe then flows through passage 18, cavity 26 and passage 12 to the brake cylinders on the motor and trailer cars.

If the brake pipe pressure should be suddenly reduced by a parting of the brake pipe or otherwise, the emergency valve devices on the cars are shifted to emergency position, in which the slide valve 8 opens the brake cylinder passage 12 to the valve chamber 9. Fluid is then supplied from the main reservoir on the motor car and the auxiliary reservoir on the trailer car to the respective brake cylinders.

According to my invention, in order to release after an emergency application of the brakes, the atmospheric vent from the brake pipe having been closed, fluid under pressure flows through the restricted port 21 on the motor car from the valve chamber 9 and the main reservoir to the brake pipe 2 and as soon as the pressures upon opposite sides of the emergency piston have equalized, the same is shifted to release position, since the piston head 16 is subject to atmospheric pressure when the brake valve is in release position.

It will now be seen that means are provided whereby the brakes may be readily released after an emergency application of the brakes, while exhaust of fluid from the brake cylinder on the trailer car to the brake pipe is prevented.

Having now described my invention, what I claim as new and desire to secure by Letters Patent, is:

1. In a fluid pressure brake, the combination with a brake pipe and a valve device operated by a reduction in brake pipe pressure for effecting an application of the brakes, of a source of fluid under pressure associated with said valve device for charging the brake pipe with fluid under pressure from said source and a port controlled by the movement of said valve device for permitting flow of fluid from the source of pressure to the brake pipe in application position.

2. The combination with a brake pipe and a source of fluid pressure, of an emergency valve device having a piston subject to brake pipe pressure and a valve operated by said piston and provided with a port adapted for supplying fluid from said source to the brake pipe upon an emergency application of the brakes.

3. In a fluid pressure brake, the combination with a brake pipe, a source of fluid pressure, and a brake cylinder, of an emergency valve device operated upon a reduction in brake pipe pressure for effecting an emergency application of the brakes and provided with a valve having a restricted port for supplying fluid from the source of pressure to the brake pipe in emergency position.

4. In a fluid pressure brake, the combination with a brake pipe, a source of fluid pressure, and a brake cylinder, of an emergency valve device operated upon a reduction in brake pipe pressure for effecting an emergency application of the brakes and having a slide valve adapted in release position to provide free communication from said source of fluid pressure to the brake pipe and restricted communication in emergency application position.

5. In a fluid pressure brake, the combination with a brake pipe, a main reservoir, and a brake cylinder, of an emergency valve device operated upon a sudden reduction in brake pipe pressure for effecting an emergency application of the brakes and comprising a piston and a slide valve operated by said piston, said valve having a restricted port adapted in the emergency position of the valve to supply fluid from the main reservoir to the brake pipe.

In testimony whereof I have hereunto set my hand.

WALTER V. TURNER.

Witnesses:
A. M. CLEMENTS,
S. W. KEEFER.